United States Patent Office 3,535,005
Patented Oct. 20, 1970

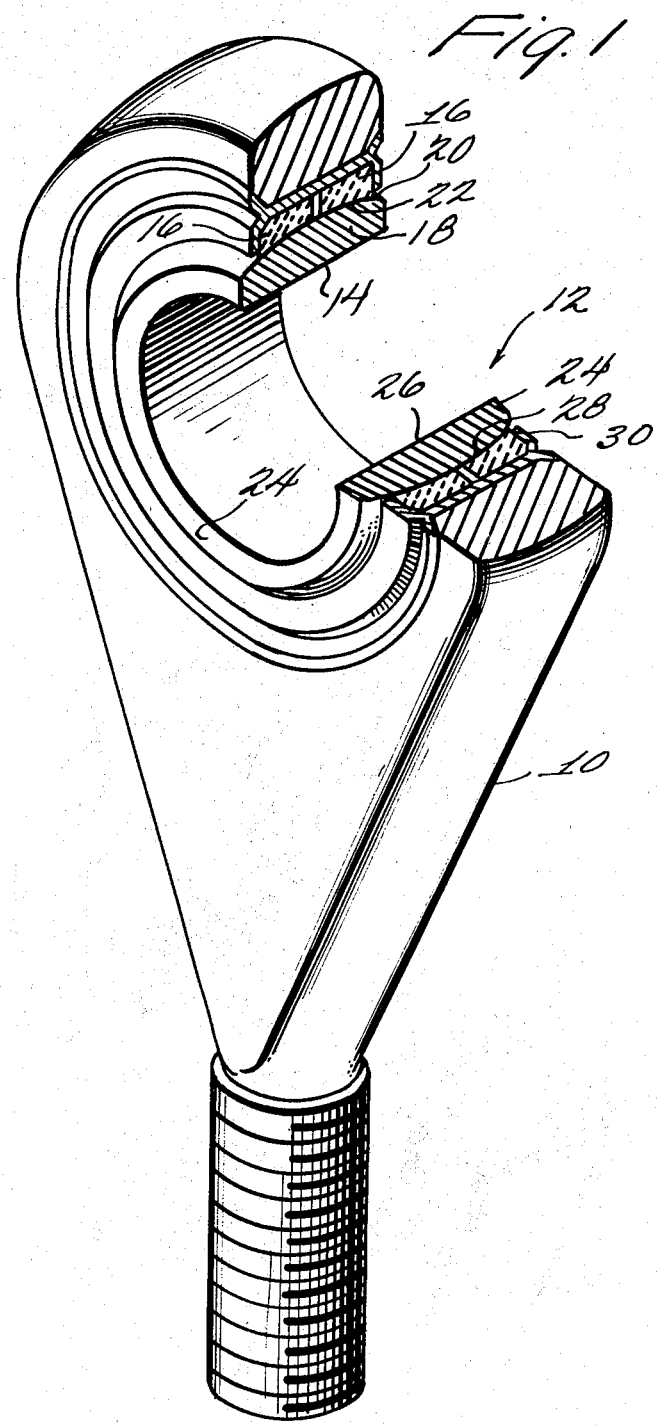
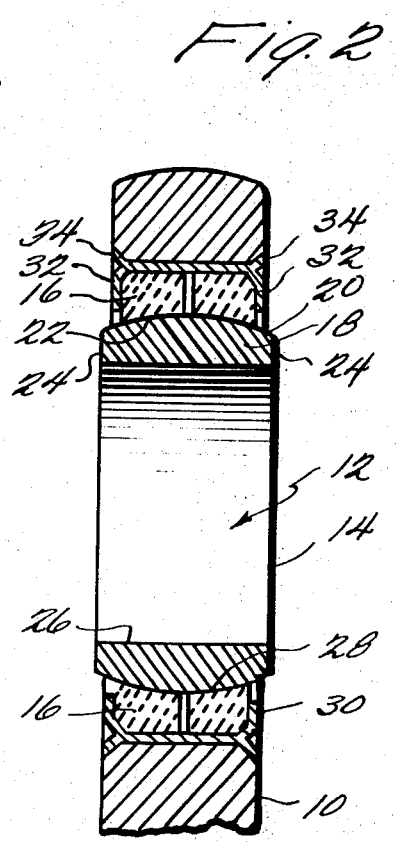

3,535,005
BEARING CONSTRUCTION
Stanley S. Orkin, Rockville, Conn., and Vincent J. Hudacko, Copley, Ohio, assignors to Kaman Corporation, Bloomfield, Conn., a corporation of Connecticut
Continuation-in-part of application Ser. No. 582,894, Sept. 29, 1966, which is a continuation-in-part of application Ser. No. 542,417, Apr. 13, 1966. This application Nov. 20, 1968, Ser. No. 792,183
Int. Cl. F16c 1/24
U.S. Cl. 308—72                    13 Claims

ABSTRACT OF THE DISCLOSURE

A plain dry bearing consists of two relatively movable members, one providing a rubbing bearing surface made of a solid lubricant material and the other providing a rubbing bearing surface made of a thin ceramic coating on a metal substrate. The ceramic coating is sufficiently thin, less than 0.010 of an inch, that it may deform under load and transfer stresses to the metal substrate, thereby reducing the possibility of fracturing the coating and producing a bearing having both the low wear property of the ceramic coating and the high load carrying capability of the metal substrate.

CROSS REFERENCE TO RELATED APPLICATIONS

This application is a continuation-in-part of application Ser. No. 582,894 filed Sept. 29, 1966, now abandoned, which in turn is a continuation-in-part of application Ser. No. 542,417 filed Apr. 13, 1966, now Pat. No. 3,428,374.

This invention relates to bearings and deals more particularly with an improved plain bearing construction.

The bearing of this invention is in some respects similar to the bearing shown in our copending application Ser. No. 542,417, filed Apr. 13, 1966, and entitled Self-Lubricating Bearing. In one embodiment of a bearing assembly shown in said application, the bearing assembly comprises two bearing members having coengaging surfaces which are movable relative to another, the surface of the first of said members being made from a compacted blend of amorphous carbon and graphite impregnated with a metal and the surface of the second of said members being provided by a body of polycrystalline aluminum oxide having an average grain size of 45 microns or finer and a density of at least 3.80 grams per cubic centimeter, said body being made from at least 99 weight percent polycrystalline aluminum oxide. In the bearing construction of this invention, the surface of the first of said members is made at least in part of a solid lubricant material and said second member of the bearing comprises a substrate made of metal, such as titanium, a titanium base alloy, a ferrous alloy such as stainless steel, aluminum or an aluminum base alloy, coated with a ceramic material, to produce a bearing capable of handling higher static and dynamic loads while nevertheless retaining all of the other desirable properties of the bearing described in the preceding application.

The general object of this invention is therefore to provide a plain bearing capable of operating without lubrication at a low wear rate and therefore having a prolonged service life.

A further object of this invention is to provide a bearing construction of the foregoing character capable of operating satisfactorily over a wide temperature range, particularly up to a temperature as high as 800° F., and in adverse atmospheres.

Other objects of the invention are to provide a bearing of the foregoing character which may be made in a variety of different shapes and forms, having a low static radial load displacement, a low starting torque, corrosion resistance, and requiring no initial wear-in phase.

Other objects and advantages of the invention will be apparent from the following description and from the drawings forming a part hereof.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

In the drawings:

FIG. 1 is a perspective view of a rod end containing a bearing embodying the present invention, parts of the rod end and bearing being broken away to reveal more clearly the structure of the bearing; and FIG. 2 is a vertical sectional view taken through the rod end of FIG. 1.

The bearing assembly of this invention is of the type commonly referred to as a plain bearing. It comprises two bearing members having coengaging surfaces which slide rather than roll relative to one another. In the bearing assembly of this invention the two coengaging surfaces are made respectively from a ceramic material and a solid lubricant material. The solid lubricant surface may be provided by a layer of solid lubricant material supported by another backing material or may be provided by a relatively massive body of such material. The solid lubricant material itself is one having, in its solid state, an inherent lubricity or slipperiness. In the presently preferred case the solid lubricant surface is provided by a massive body of solid lubricant consisting largely of carbonaceous material, as, for example, a body made solely of a compacted mixture of amorphous carbon and graphite or a body made of a compacted mixture of amorphous carbon and graphite impregnated with a metal or other material, such as silver or antimony. The ceramic surface is in turn provided by a thin coating of ceramic material deposited or otherwise applied to a metal substrate, preferably one having a relatively high tensile strength in comparison to that of the ceramic, and a high resistance to corrosion such as titanium, a titanium base alloy, a ferrous alloy such as stainless steel, aluminum or an aluminum alloy. The combination of the ceramic and solid lubricant surfaces results in a dry bearing utilizing the inherent lubricity of the solid lubricant material and requiring no additional lubricant.

The high wear resistance of the ceramic material reduces wear of the bearing parts and enables the parts to retain their initial shapes and dimensions over a long service life. The use of the thin ceramic coating on the metal substrate further reduces problems of fracturing, chipping or otherwise breaking or damaging the ceramic material due to its relatively low tensile strength, the higher strength metal substrate serving to carry the major portion of the tensile loads. That is, the high strength property of the substrate material is married to the low wear property of the ceramic material to produce a bearing having both low wear and high load carrying capability.

To produce this result it has been found that the ceramic coating must be sufficiently thin to permit slight deformation thereof, as a result of deformation of the substrate under load, without its fracturing, to achieve a transferal of the surface stresses, which would otherwise build up in the coating, to the substrate. Furthermore, the tensile strength of the substrate must be within a particular range. If the tensile strength is too low, the substrate will not provide proper support or backing for the coating and under load the substrate will deform to too large an extent and cause fracture of the coating. If the tensile strength of the substrate is too high, the substrate will not provide a proper cushioning effect, surface stresses will not be transferred to the substrate, and the coating will fracture or otherwise fail as a result of such stresses. In particular, it is found that the tensile strength of the substrate should lie within the range of 35,000 to 250,000 p.s.i. to achieve a proper balance between the tendency of the coating to fracture as a result of deformation and the tendency of the coating to fracture as a result of surface stresses. Also, the coating must have a thickness ranging betwen 0.0005 to 0.010 inch, a thickness of 0.005 to 0.001 inch being presently preferred.

It has also been found that the use of titanium or a titanium base alloy as the substrate material is particularly desirable insofar as this metal provides an especially good bond with the ceramic coating. In addition, this substrate material is more chemically inert than most other materials which might be used and thereby eliminates or reduces any possibility of corrosion in an adverse atmosphere as might occur with other materials. This substrate material is also lighter in weight than most other materials which might be used and therefore offers the possibility of a weight reduction. It also has the property of retaining its strength when subjected to relatively high temperatures, i.e. up to approximately 80° F. and therefore permits the construction of a bearing capable of operating at such elevated temperatures. Also, and perhaps more important, it has a coefficient of thermal expansion substantially equal to that of the various coating materials which may be used for the ceramic coating and therefore little or no stresses are built up on the coating as a result of differential expansion of the substrate and the coating when operating over a wide temperature range.

The material of the ceramic coating used on the substrate may vary widely; however, it has been found that coating materials made up predominantly of one or the other of five specific base compounds provide particularly good results, especially in combination with a substrate of titanium or titanium base alloy. The five base compounds preferred for the coating materials are chromium oxide ($Cr_2O_3$), titanium dioxide ($TiO_2$), aluminum oxide ($Al_2O_3$), titanium carbide (TiC), and tungsten carbide (WC). Each of these compounds may be used either in substantially pure form or in combination with other additives intended to produce a more desirable coating or to facilitate the application of the coating to the substrate. Examples of mixtures which may be used are (80% $Cr_2O_3$+20% NiCr), (TiC+5–20% Ni), (50% WC+35% NiCr+15% NiAl), and (WC+9% Co), where NiCr is made up of 80% Ni and 20% Cr and wherein the percentages given are volume percentages. Of all the combinations of materials which may be used when making the various parts of the bearing, the combination which is presently preferred consists of a first bearing member having a surface made of a body of compacted amorphous carbon and graphite impregnated with silver and a second member comprising a substrate made of a titanium base alloy including, in addition to the titanium, 5% by weight of aluminum and 2.5% by weight of tin (Ti-5Al-2.5Sn), and a ceramic coating of substantially pure chromium oxide. Substantially the same results are obtained by replacing this titanium base alloy with an alloy including, in addition to the titanium, 6% by weight of aluminum and 4% by weight of vanadium (Ti-6Al-4V).

A bearing embodying the present invention is shown in the drawing and, by way of example, is shown to be in the form of a spherical bearing incorporated in a rod end. The rod end is comprised of an externally threaded banjo 10 having a transverse bore which receives the bearing, indicated generally at 12. The two coengaging and relatively slidable members of the bearing consist of an inner ball member 14 and an outer member comprised of two separate annular bodies or rings 16, 16. The inner ball member 14 is a composite member and consists of a metallic substrate 18 and a ceramic coating 20. The substrate 18 is of a shape similar to that conventionally used for the ball member of a spherical bearing, it being annular in shape and having a spherical outer surface 22 which receives the ceramic coating 20. The coating 20, as mentioned, has a thickness of less than 0.010 of an inch and has an outer surface 23, conforming to the spherical surface 22 of the substrate, which is lapped or otherwise finished to a very high degree of smoothness. Preferably the finish has a smoothness value of at least 5 RMS or better although it will be recognized that a smoothness value above 5 RMS can also be employed. A bore 26 extends through the substrate 18 and at each end of the bore the substrate includes an end face 24 arranged perpendicular to the axis of the bore, the end faces 24, 24 therefore forming an annular corner at each end of the bore. In use, the threaded portion of the banjo 10 is threadably connected with one mechanism part and another mechanism part is connected to the inner bearing member 14 by a connecting member inserted through its bore. The end faces 24, 24 are free of the ceramic coating 20 and constitute surfaces against which washers or other retaining means may be tightly pressed for fixing such another part to the bearing during use thereof. It will therefore be noted that clamping forces which are applied between the end faces 24, 24 are resisted directly by the metallic substrate 18 and are not transmitted to any appreciable degree to the material of the ceramic coating 20. Damage to the ceramic material by the forces exerted on the inner member by the retaining means is therefore avoided.

The outer bearing member of the bearing 12, made up of the two annular bodies 16, 16 includes an internal spherical bearing surface 28 which engages the outer surface 23 of the ceramic coating on the inner member 14. The two rings or annular bodies 16, 16 are comprised at least in part of a carbonaceous material and, as mentioned, are preferably comprised of a blend of compacted amorphous carbon and graphite, and may if desired be impregnated with silver, antimony or other additional material. These two rings 16, 16 are held in place by a retainer 30 having two radially inwardly directed flanges 32, 32 engaging opposite side surfaces of the rings and having two other flanges 34, 34 which are swaged radially outwardly against inclined annular seating surfaces on the banjo 10 to hold the retainer in the banjo. Through the coengaging spherical bearing surfaces 23 and 28, the inner member 14 is free to move in a universal manner relative the ring members 16, 16. In this type of bearing, it is therefore impossible to exert high bending or shear loads on the inner member 14 as a result of misalignment and because of this the ceramic coating is particularly well suited to this type of bearing insofar as deformation of the coating due to high bending or shear loads is avoided.

The illustrated bearing is, however, designed to handle relatively high radial loads which, during movement of the innner member relative to the other member, produce tensile stresses in various portions of the inner member 14. The fact that the inner member 14 is comprised almost entirely of a high strength metal, and includes only a thin ceramic coating, allows the metal to react to absorb the tensile stresses without any high unit stresses being applied to the ceramic coating, the coating thereby being protected against damage by such stresses. Furthermore, the ceramic coating is of such a thickness as to be capable of deforming slightly with deformation of the substrate to allow transfer of stresses which would otherwise be built up in the coating, to the substrate, the coating thickness ranging between 0.0005 and 0.010 of an inch thick, and preferably about 0.004 of an inch thick, and the material of the substrate having a tensile strength falling within the range of 35,000 to 250,000 p.s.i.

The inner member 14 of an actual bearing such as shown in the drawing was made by the following process which is set hereforth in further explanation of the details of the bearing construction: A substrate or metal ball member was made by machining titanium alloy rod (Ti-5Al-2.5Sn) into a spherical shape having an approximate diameter of 0.005 to 0.010 inch under the final desired ball diameter and a surface finish of approximately 125 RMS. The bore and the two flat end faces were also machined at this time and the rod used was one previous annealed to a hardness falling within the range of 30Rc to 40Rc and having a tensile strength of approximately 120,000 p.s.i. Masks were then applied to the end faces and thereafter the surface of the ball was roughened by vapor blasting to provide better adherence for the coating. The spherical surface of the ball was then coated with a layer of chormium oxide ($Cr_2O_3$) to a thickness of 0.005 to 0.010 inch, the coating being applied by plasma spray gun equipment. After coating, the final spherical shape, surface finish and diameter were established by a lapping process, the resulting thickness of the finish coating being in the range of .0025 to .005 inch.

As an alternative to roughening the surface of the ball by a vapor blasting technique, this same effect can be achieved by other conventional methods such as by frit blasting or the like.

The invention claimed is:

1. A self-lubricated bearing assembly comprising two bearing members having coengaging surfaces which are movable relative to one another, the surface of the first of said members being made at least in part of a solid inorganic lubricant material, and the surface of the second of said members being provided by a body of a ceramic material selected from the group consisting of aluminum oxide, chromium oxide, titanium dioxide, tungsten carbide, titanium carbide, and their mixtures, said body of ceramic material comprising a coating having a thickness ranging from 0.0005 to 0.01 inch on a metallic substrate having a tensile strength ranging from 35,000 to 250,000 p.s.i., said metallic substrate consisting essentially of a metal selected from the group consisting of titanium, titanium base alloys, ferrous alloys, aluminum and aluminum base alloys.

2. The self-lubricated bearing assembly of claim 1 wherein said solid inorganic lubricant material comprises a carbonaceous material.

3. The self-lubricated bearing assembly of claim 1 wherein said first member includes at least one ring made at least in part of carbonaceous material and having an inwardly facing spherical surface, and said metallic substrate of said second member is annular in shape and has an outwardly facing spherical surface, said ceramic coating being fixed to and directly overlying said outwardly facing spherical surface.

4. The self-lubricated bearing assembly of claim 3 wherein said annular substrate has two oppositely directed end surfaces, said ceramic coating terminating short of said end surfaces so as to expose the latter.

5. The self-lubricated bearing assembly of claim 1 wherein said metallic substrate is made from a metal selected from the group consisting of titanium and titanium base alloys, and said ceramic coating comprises a material selected from the group consisting of aluminum oxide, chromium oxide, titanium dioxide, tungsten carbide, and titanium carbide.

6. The self-lubricated bearing assembly of claim 1 wherein said metallic substrate is made from a metal selected from the group consisting of titanium and titanium base alloys, and said ceramic coating comprises chromium oxide.

7. The self-lubricated bearing assembly of claim 1 wherein said solid lubricant material comprises a blend of amorphous carbon and graphite.

8. The self-lubricated bearing assembly of claim 7 wherein said blend of amorphous carbon and graphite is impregnated with a metal selected from the group consisting of silver and antimony.

9. The bearing assembly of claim 1 wherein said metallic substrate comprises an annular member having a bore extending therethrough and having a spherical outer surface coaxial with said bore, said ceramic coating covering said spherical outer surface, and said first member including a spherical surface engaging said ceramic coating to permit universal movement of said second member relative to said first member.

10. The bearing assembly of claim 9 wherein said annular substrate member includes two flat faces located respectively at the opposite ends of said bore and in planes perpendicular to the axis of said bore, said two flat faces being free of said ceramic coating.

11. The self-lubricated bearing assembly of claim 1 wherein said metallic substrate is made from a metal selected from the group consisting of titanium and titanium base alloys, and said ceramic coating comprises aluminum oxide.

12. The self-lubricated bearing assembly of claim 1 wherein said metallic substrate is a ferrous alloy and said ceramic coating comprises chromium oxide.

13. The self-lubricated bearing assembly of claim 1 wherein said metallic substrate is a ferrous alloy and said ceramic coating comprises aluminum oxide.

References Cited

UNITED STATES PATENTS

| | | | |
|---|---|---|---|
| 2,058,143 | 10/1936 | Flanders. | |
| 2,179,824 | 11/1939 | Kip. | |
| 2,365,552 | 12/1944 | Hill | 287—90 X |
| 2,482,205 | 9/1949 | Potts | 308—238 |
| 2,541,790 | 2/1951 | Sugden. | |
| 2,582,084 | 1/1952 | Terrey | 308—4 |
| 2,613,119 | 10/1952 | Seemann | 308—237 X |
| 2,696,413 | 12/1954 | Wheildon. | |
| 2,733,968 | 2/1956 | Pelz | 308—238 |
| 2,752,210 | 6/1956 | Clark. | |
| 2,760,925 | 8/1956 | Bryant | 308—241 X |
| 2,934,480 | 4/1960 | Slomin | 308—241 X |
| 3,037,828 | 6/1962 | Michael. | |
| 3,273,944 | 9/1966 | Hammon | 308—241 |
| 3,284,144 | 11/1966 | Moore | 308—3 |
| 3,285,680 | 11/1966 | Dailey | 308—241 |

FOREIGN PATENTS

| | | |
|---|---|---|
| 187,756 | 11/1956 | Austria. |
| 1,023,007 | 3/1966 | Great Britain. |

MANUEL A. ANTONAKAS, Primary Examiner

U.S. Cl. X.R.

308—238, 241